United States Patent
Nelson, Jr. et al.

(10) Patent No.: US 11,494,952 B1
(45) Date of Patent: Nov. 8, 2022

(54) EFFICIENT INTEGRATION OF DATA INTO AUGMENTED AND VIRTUAL REALITY ENVIRONMENTS

(71) Applicant: INTERLEEV, LLC, Cedar City, UT (US)

(72) Inventors: H. Roice Nelson, Jr., Cedar City, UT (US); Steven C. Swann, Cedar City, UT (US)

(*) Notice: Subject to any disclaimer, the term of this patent is extended or adjusted under 35 U.S.C. 154(b) by 0 days.

(21) Appl. No.: 17/679,718

(22) Filed: Feb. 24, 2022

(51) Int. Cl.
| G06T 11/00 | (2006.01) |
| G06F 16/29 | (2019.01) |
| G06F 16/22 | (2019.01) |
| G06F 3/01  | (2006.01) |

(52) U.S. Cl.
CPC ............ *G06T 11/00* (2013.01); *G06F 3/011* (2013.01); *G06F 16/2246* (2019.01); *G06F 16/29* (2019.01)

(58) Field of Classification Search
None
See application file for complete search history.

(56) References Cited

U.S. PATENT DOCUMENTS

| 8,493,380 B2* | 7/2013 | Aihara | G06T 15/205 345/419 |
| 2007/0106455 A1* | 5/2007 | Fuchs | G01C 21/32 701/438 |
| 2015/0019531 A1* | 1/2015 | Bursey | G06F 16/29 707/736 |
| 2015/0127657 A1* | 5/2015 | Hung | G06F 16/313 707/741 |
| 2015/0254276 A1* | 9/2015 | Oliver | G06F 16/22 707/741 |
| 2016/0283515 A1* | 9/2016 | Moussalli | G01S 19/13 |
| 2021/0385610 A1* | 12/2021 | Zhang | G06F 16/29 |

OTHER PUBLICATIONS

Irene Gargantini; "An Effective Way to Represent Quadtrees;" Communications the ACM; vol. 25, No. 12, Dec. 1982; pp. 905-910; IEEE (Year: 1982).*
Qian et al.; "GeoSOT-Based Spatiotemporal Index of Massive Trajectory Data;" ISPRS International Journal of Geo-Information; MDPI, Basel, Switzerland; 12 pages; (Year: 2019).*

* cited by examiner

*Primary Examiner* — Edward Martello
(74) *Attorney, Agent, or Firm* — David R. Conklin; Kirton McConkie

(57) ABSTRACT

Data can be efficiently integrated into augmented and virtual reality environments. A location index consisting of a hierarchical arrangement of location tags can be defined for a planet. Each location tag can represent a cell in a hierarchical arrangement of grids where each cell encompasses a location on the planet. Location tags can be associated with data to allow the data relevant to a location in the augmented or virtual reality environment to be quickly and efficiently retrieved using the location tags. Other indexes can be used to define hierarchical arrangements of other tags to further facilitate retrieving relevant data for integration in the augmented or virtual reality environment.

20 Claims, 12 Drawing Sheets

| Billion Years | Million Years | Million Years | Million Years | Thousand Years | Thousand Years | Thousand Years | Years |
|---|---|---|---|---|---|---|---|
| 16 | 2,000 | 256 | 32 | 4,000 | 512 | 64 | 8 | 1,000 |
| 14 | 1,750 | 224 | 28 | 3,500 | 443 | 56 | 7 | 875 |
| 12 | 1,500 | 192 | 24 | 3,000 | 334 | 48 | 6 | 750 |
| 10 | 1,250 | 160 | 20 | 2,500 | 320 | 40 | 5 | 625 |
| 8 | 1,000 | 128 | 16 | 2,000 | 256 | 32 | 4 | 500 |
| 6 | 750 | 96 | 12 | 1,500 | 192 | 24 | 3 | 375 |
| 4 | 500 | 64 | 8 | 1,000 | 128 | 16 | 2 | 250 |
| 2 | 250 | 32 | 4 | 500 | 64 | 8 | 1 | 125 |
| T1 | T2 | T3 | T4 | T5 | T6 | T7 | T8 | T9 |

| Years | Years | Months | Days | Days | Hours | Minutes | Minutes | Seconds |
|---|---|---|---|---|---|---|---|---|
| 128 | 16 | 24 | 96 | 12.0 | 36.0 | 320 | 40 | 330 |
| 112 | 14 | 21 | 84 | 10.5 | 32.5 | 280 | 35 | 280 |
| 96 | 12 | 18 | 72 | 9.0 | 27.0 | 240 | 30 | 240 |
| 80 | 10 | 15 | 60 | 7.5 | 22.5 | 200 | 25 | 200 |
| 64 | 8 | 12 | 48 | 6.0 | 18.0 | 160 | 20 | 160 |
| 48 | 6 | 9 | 36 | 4.5 | 13.5 | 120 | 15 | 120 |
| 32 | 4 | 6 | 24 | 3.0 | 9.0 | 80 | 10 | 80 |
| 16 | 2 | 3 | 12 | 1.5 | 4.5 | 40 | 5 | 40 |
| T10 | T11 | T12 | T13 | T14 | T15 | T16 | T17 | T18 |

FIG. 8

EFFICIENT INTEGRATION OF DATA INTO AUGMENTED AND VIRTUAL REALITY ENVIRONMENTS

CROSS-REFERENCE TO RELATED APPLICATIONS

N/A

BACKGROUND

The Internet and sister intranets (e.g., internal private Internets) started as a means of military and then scientific communication. They have become powerful tools, but also frothy, because of the turbulence in data searching and retrieval. In order to not drown in the froth, it is necessary get to the central themes and structures of ideas in terms of meaningful results. These central themes revolve around location, time, process, data type, and individuals, with location being key for augmented reality.

For instance, if data is defined as instances of specific meanings in a specific framework (e.g., 84720 is the zip code for Cedar City, Utah in the United States), then the location information tied to data creation and usage is key to understanding, processing, and integrating this data into a simulation or augmented reality session in order to optimize the specific environment the data describes. Similarly, if information is defined as cumulative data in context related to a specific purpose, there are threads of location, time, process, and data type woven through all information available on-line, in libraries, and in an environment being evaluated.

Working with data and information provides experience. If a situation has been monitored, and regular measurements show repeatable consequences for specific actions or inputs, then the environment has been simulated and knowledge obtained. Knowledge is the progressive gathering of bits of experience, or cumulative experience, along with the links which associate these disparate parts into a unified whole. Capture of this experience and knowledge is becoming possible with sensors to monitor and measure specific environments. These concepts of capture, process, and usage culminate with identification and definition of wisdom. Wisdom is knowledge of what is true and right, coupled with good judgment, and is embodied in those who remember the recipe and can tell the stories.

Location and time are key threads running through data, information, knowledge, and wisdom. Digital representations of these factors have been complicated by projections, measurements, and recording conventions. Digital worlds simplify these complications with transformations and semi-automated translations. However, in virtual reality and augmented reality worlds, even with high bandwidth connections, gigantic digital storage, and very fast processors, it takes too long to retrieve and display needed information from disparate sources.

BRIEF SUMMARY

The present invention extends to systems, methods and computer program products for the efficient integration of data into augmented and virtual reality environments. A location index consisting of a hierarchical arrangement of location tags can be defined for a planet. Each location tag can represent a cell in a hierarchical arrangement of grids where each cell encompasses a location on the planet. Location tags can be associated with data to allow the data relevant to a location in the augmented or virtual reality environment to be quickly and efficiently retrieved using the location tags. Other indexes can be used to define hierarchical arrangements of other tags to further facilitate retrieving relevant data for integration in the augmented or virtual reality environment.

In some embodiments, the present invention may be implemented as a method for efficiently integrating data into an augmented or virtual reality environment. A location index that defines a hierarchical arrangement of location tags may be obtained. Each location tag can define a location on a planet. The location index can be used to determine location tags for data to be made available in an augmented or virtual reality environment. The location tags can be associated with the data to thereby enable the data to be retrieved for inclusion in the augmented or virtual reality environment using the location tags.

In some embodiments, the present invention may be implemented as computer storage media storing computer executable instructions which when executed implement a method for tagging data to facilitate integration of the data in an augmented or virtual reality environment. A location index comprising location tags can be maintained. Each location tag can represent a cell within a hierarchical arrangement of grids. Each cell can encompass a location on a planet. Data may be identified for inclusion in an augmented or virtual reality environment for the planet. Locations within the planet to which the data pertains may be determined. Based on the locations within the planet to which the data pertains, location tags can be determined for the data from the location index. The location tags can be associated with the data to thereby enable the data to be retrieved for inclusion in the augmented or virtual reality environment for the planet using the location tags.

In some embodiments, the present invention may be implemented as an augmented or virtual reality system that includes one or more processors that implement an engine for creating an augmented or virtual reality environment of a planet and one or more computer storage media storing a location index comprising location tags. Each location tag may represent a cell within a hierarchical arrangement of grids. Each cell may encompass a location on the planet. The engine may be configured to integrate data into the augmented or virtual reality environment by: determining a first location of a user within the augmented or virtual reality environment; accessing the location index to obtain a first location tag pertaining to the first location of the user; querying a database for data that is associated with the first location tag; and integrating the data that is associated with the first location tag into the augmented or virtual reality environment.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 8 provides an example of a time index that may be used in one or more embodiments of the present invention.

DETAILED DESCRIPTION

Embodiments of the present invention encompass techniques for efficiently integrating data into augmented and virtual reality environments. In this context, the term "data" should encompass any information that can be integrated into augmented or virtual reality environments, such as but not limited to, images, maps, photographs, videos, animations, simulations, audio, text, etc. The term "planet" should be given its ordinary meaning but may also encompass other astronomical bodies such as asteroids, comets, stars, etc. Accordingly, a planet can be any body or portion thereof that can be represented with an augmented or virtual reality environment.

Embodiments of the present invention may leverage a hierarchical grid to define a location index consisting of location tags that uniquely identify locations on a planet. These location tags can be associated with data to enable such data to be quickly and efficiently identified for inclusion in an augmented or virtual reality environment.

Figure 1:
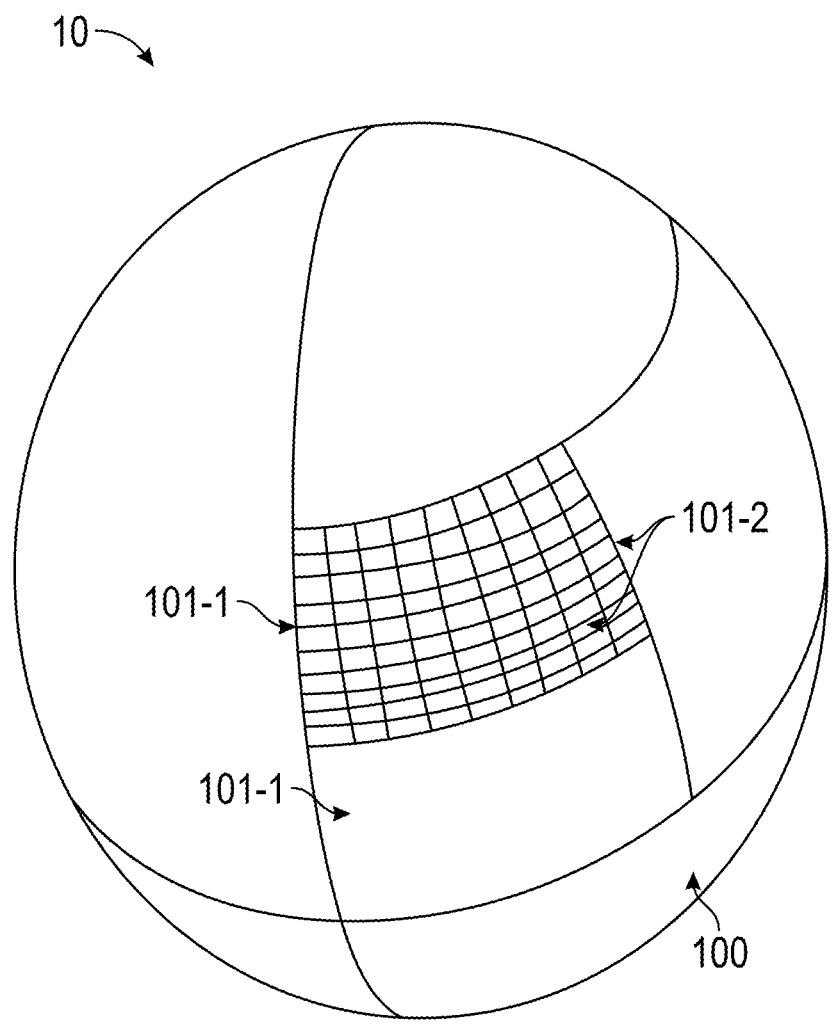
FIG. 1 provides an example of how a hierarchical grid can be defined for a planet in accordance with one or more embodiments of the present invention.
Figure 2:
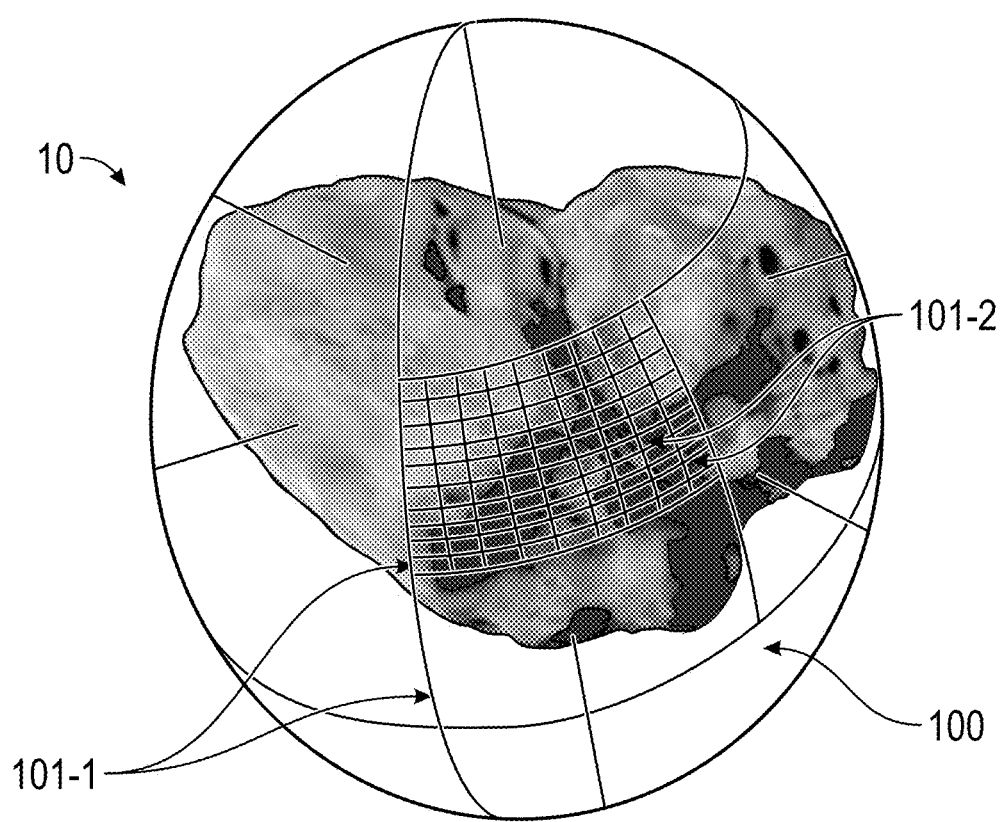
FIG. 2 provides an example of how a hierarchical grid can be defined for an asteroid in accordance with one or more embodiments of the present invention.

FIG. 1 provides an example of how a hierarchical grid 100 can be defined for a planet 10. In FIG. 1, two levels of hierarchical grid 100 are shown. A first level consists of a grid of first-level cells 101-1 (only two of which are shown) which may encompass the entirety or a portion of planet 10. A second level consists of a grid of second-level cells 101-2 within a single first-level cell 101-1. Similarly, each additional level of hierarchal grid 100 may consist of a grid of cells within a single higher-level cell. A hierarchical grid employed in embodiments of the present invention could include any reasonable number of levels and each level could have any reasonable dimensions. In FIG. 1, planet 10 is spherical. However, as shown in FIG. 2, hierarchical grid 100 could be defined for a planet 10 in the form of an asteroid or other non-spherical astronomical body.

Figure 3A:
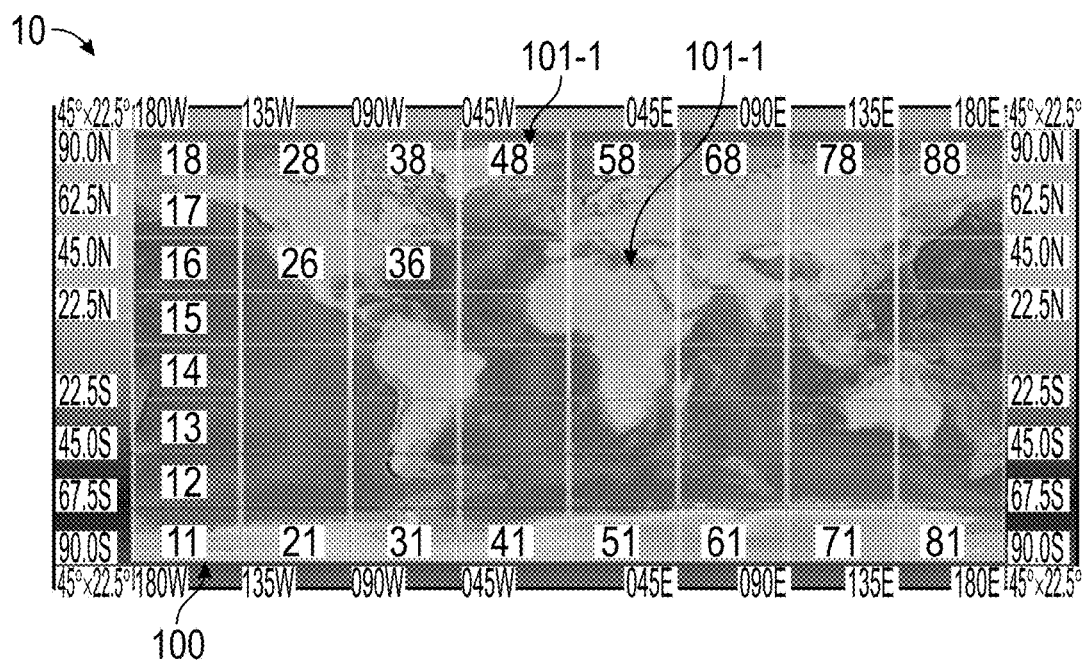
FIGS. 3A-3C represent various levels of a hierarchical grid that is configured in accordance with one or more embodiments of the present invention including how a location index can be defined using the hierarchical grid.

FIG. 3A provides an example in which planet 10 is Earth and hierarchical grid 100 is overlaid on a map projection of the entire surface of Earth. In this example, the first level of hierarchical grid 100 is an 8×8 grid of first-level cells 101-1. As labeled, each first-level cell 101-1 can be assigned a cell number representing its position within the first level of hierarchical grid 100. In this example, the origin is assumed to be at 90° South, 180° West (−90°, −180°), and cell position is counted from bottom to top and from left to right. Accordingly, the bottom left cell is assigned cell number 11 and the top right cell is assigned cell number 88, where the first number can represent the row and the second number can represent the column. Notably, the first-level cells 101-1 that encompass the United States have cell numbers of 26 and 36.

Figure 3B:
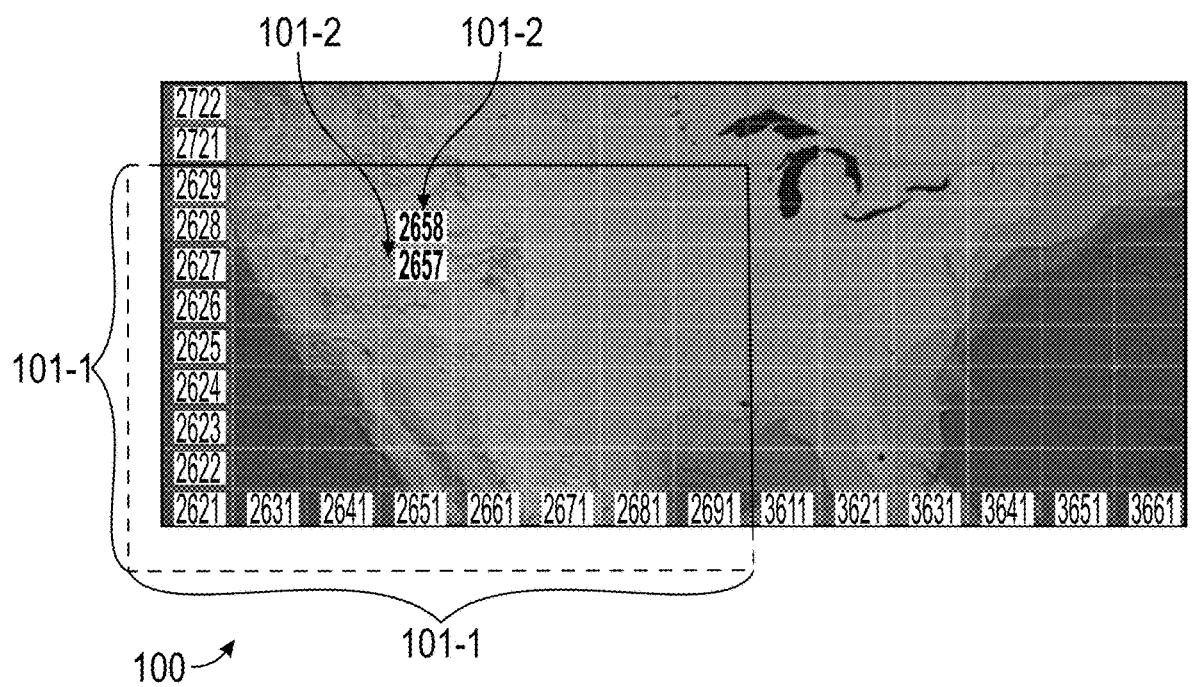

FIG. 3B provides an example of the second level of hierarchical grid 100 within the first-level cells 101-1 that encompass the United States (those with cell numbers 26 and 36 in the first level). In this example, the second level is a 9×9 grid of second-level cells 101-2. Again, each second-level cell 101-2 can be assigned a cell number representing its position within the second level of hierarchical grid 100, or more specifically, within the first-level cell 101-1 in which the second-level cell falls. Given that the second level is a 9×9 grid, these cell numbers can range from 11 to 99. Notably, the second-level cells 101-2 that encompass Utah are assigned cell numbers of 57 and 58, which when combined with the number assigned to the first-level cell 101-1 to which they belong, yields the unique identifiers or "location tags" of 2657 and 2658 for these cells.

Figure 3C:
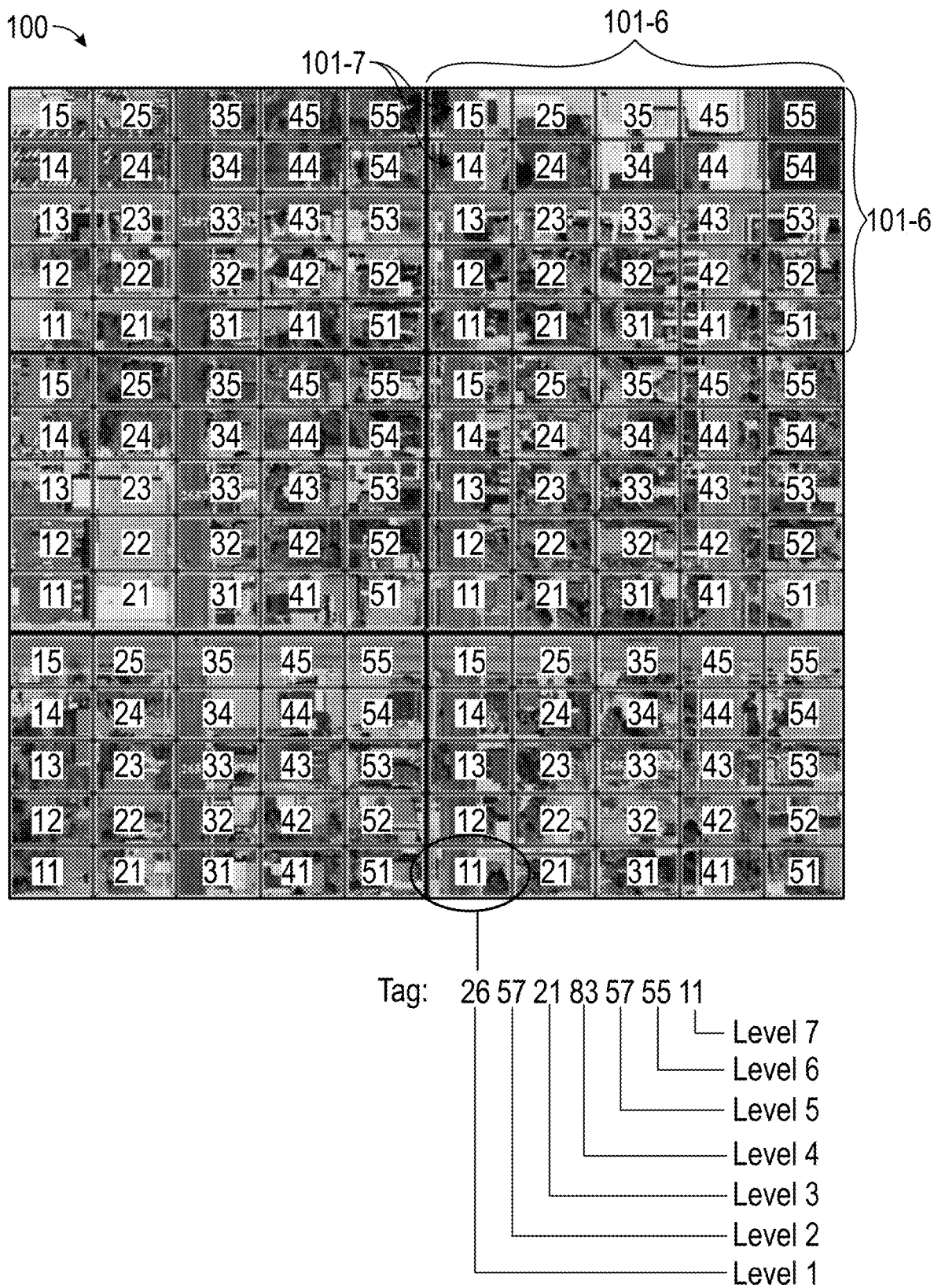

This technique for assigning a cell number to each cell in a level can be continued at each level. For example, FIG. 3C provides an example of the sixth and seventh levels of hierarchical grid 100 which encompass a portion of Cedar City, Utah. FIG. 3C shows six sixth-level cells 101-6 having location tags of 265721835745, 265721835755, 265721835841, 265721835841, 265721835842, and 265721835842. Each of these sixth-level cells 101-6 consists of a 5×5 grid of seventh-level cells 101-7; however, the grid could have another suitable dimension (e.g., 8×8). In some embodiments, the dimensions of a grid may be 9×9 or less and may be selected so that the size of each cell is a division of 7.5 minutes (longitude and latitude) such as 50 seconds, 10 second, 2 seconds, 0.025 seconds, 0.005 seconds, etc.).

The circled seventh-level cell 101-7 in FIG. 3C has a location tag of 26572183575511. As indicated, each of these seven cell numbers pertains to a cell in a different level of the hierarchy (i.e., the cell numbers of each "parent cell" and the cell number of the cell itself), and therefore, the combination of cell numbers is a location tag that uniquely identifies the location on Earth encompassed by the seventh-level cell 101-7. Additionally, with this cell numbering scheme, the location tag for each neighboring cell can be quickly and easily determined, regardless of the level of the cell. For example, to obtain the location tag for neighbors to the right and left of a cell, the leading number of the cell number assigned to the cell can be incremented or decremented by one respectively while carrying the one as necessary. For example, the right neighbor of the cell with the location tag 26572183575511 is 26572183575521 and the left neighbor of the cell with the location tag 26572183575511 is 26572183574551 (where subtracting 1 from 1 yields 5 due to the 5×5 grid used for level 7). To obtain the location tag for neighbors to the top and bottom, the same approach can be used but on the trailing number of the cell number assigned to the cell (e.g., the top neighbor of 26572183575511 is 26572183575512 and the bottom neighbor of 26572183575511 is 2657218357541).

Figure 4:
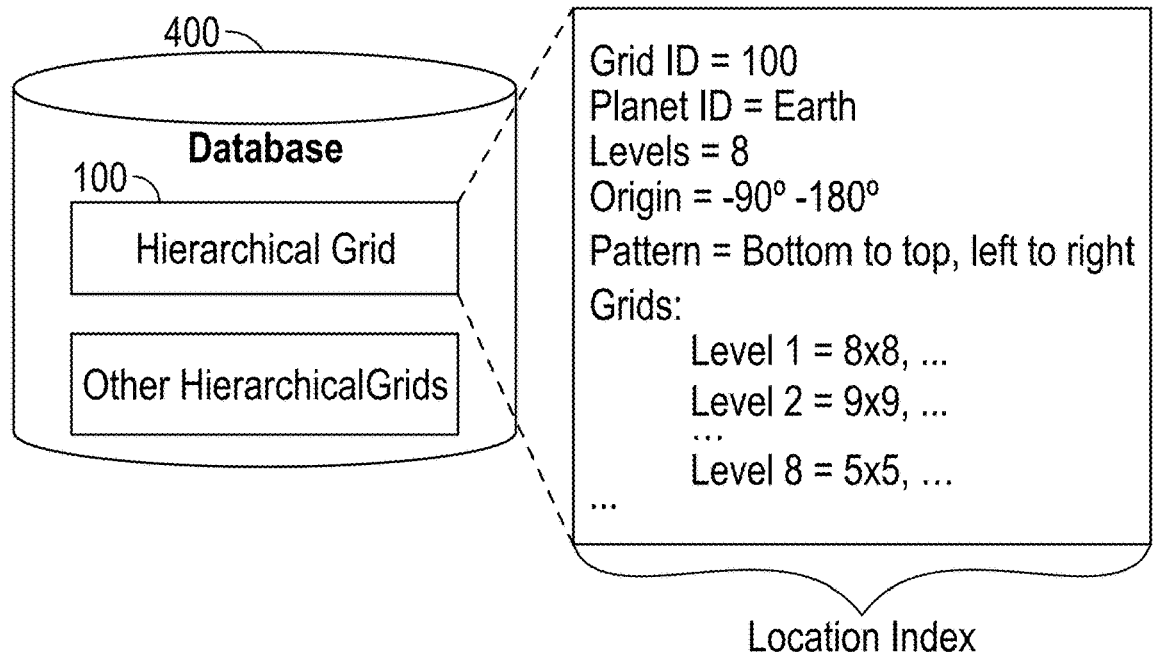
FIG. 4 provides an example of how a location index can be defined and stored in accordance with one or more embodiments of the present invention.

FIG. 4 provides an example of how hierarchical grid 100 can be defined and stored in a database 400. Database 400 can represent any suitable storage mechanism, structure, and/or format. As shown, hierarchical grid 100 may include a grid ID (e.g., a unique identifier for the hierarchical grid, which in this case is 100), a planet ID (e.g., an identification of the planet to which it pertains, which in this case is Earth), an identifier of the number of levels it includes (e.g., 8), the origin relative to the planet (e.g., the location on the planet to which the bottom left cell in the first level pertains, which in this case is −90°-180°), an identifier of the pattern by which cell numbers are defined (e.g., bottom to top, and left to right), and information about the grid at each level of the hierarchy (e.g., an indication that an 8×8 grid is used for level 1, a 9×9 grid is used for level 2, . . . and a 5×5 grid is used for level 8, an indication of the dimensions or boundaries of cells in a grid, the origin of a grid, or other information for determining whether a particular location on the planet falls within a particular cell, etc.). The collection of location tags defined by or derived from hierarchical grid 100 can be referred to as a location index.

Figure 5:
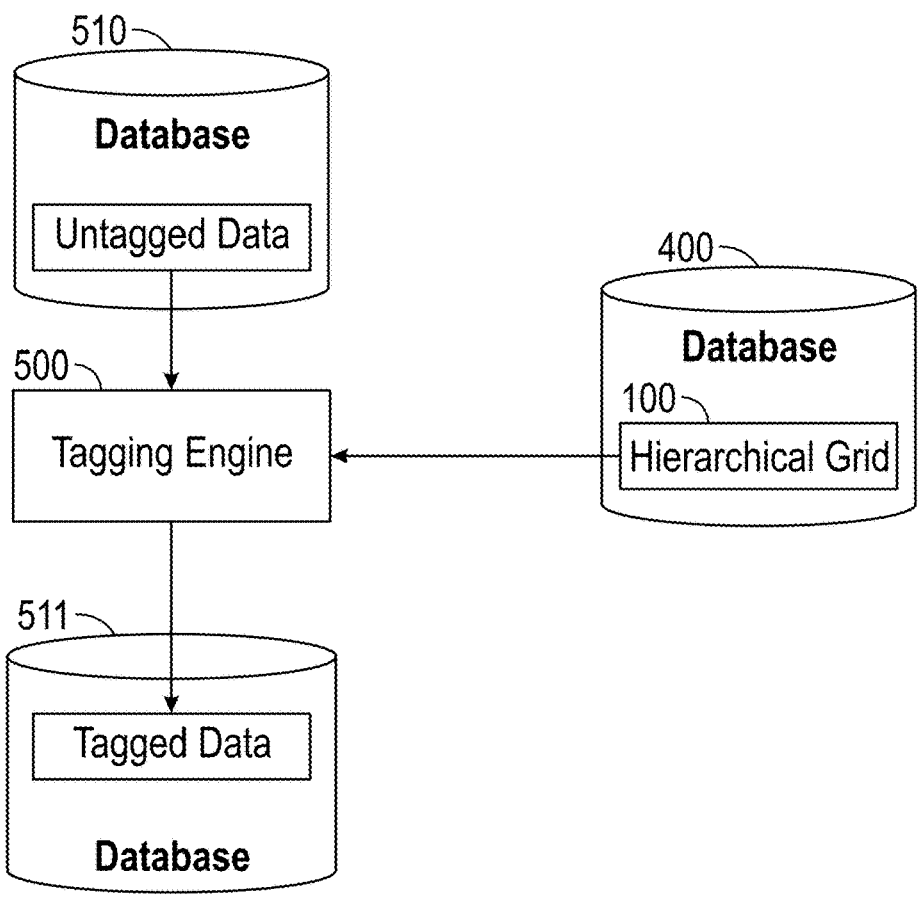
FIG. 5 illustrates how a tagging engine can employ a location index to tag data for use in an augmented or virtual reality environment in accordance with one or more embodiments of the present invention.

FIG. 5 provides a simplified example of how a tagging engine 500 can use a location index of a hierarchical grid, which in this example is hierarchical grid 100, to associate location tags with data to facilitate integration of the data in an augmented or virtual reality environment for a corresponding planet, which in this example is Earth. This data is shown as being stored in and retrieved from a database 510 and then stored in a database 511. Databases 510 and 511, like database 400, can represent any suitable storage mechanism, structure, and/or format, and need not be distinct from one another. As one example only, database 510 could represent a variety of publicly and/or privately accessible repositories storing a variety of data that may be desirable to include in an augmented or virtual reality environment of Earth. As another example only, database 511 could represent a publicly accessible repository of tagged data for use in augmented or virtual reality environments that are configured in accordance with, or configured to leverage, one or more embodiments of the present invention.

Figure 5A:
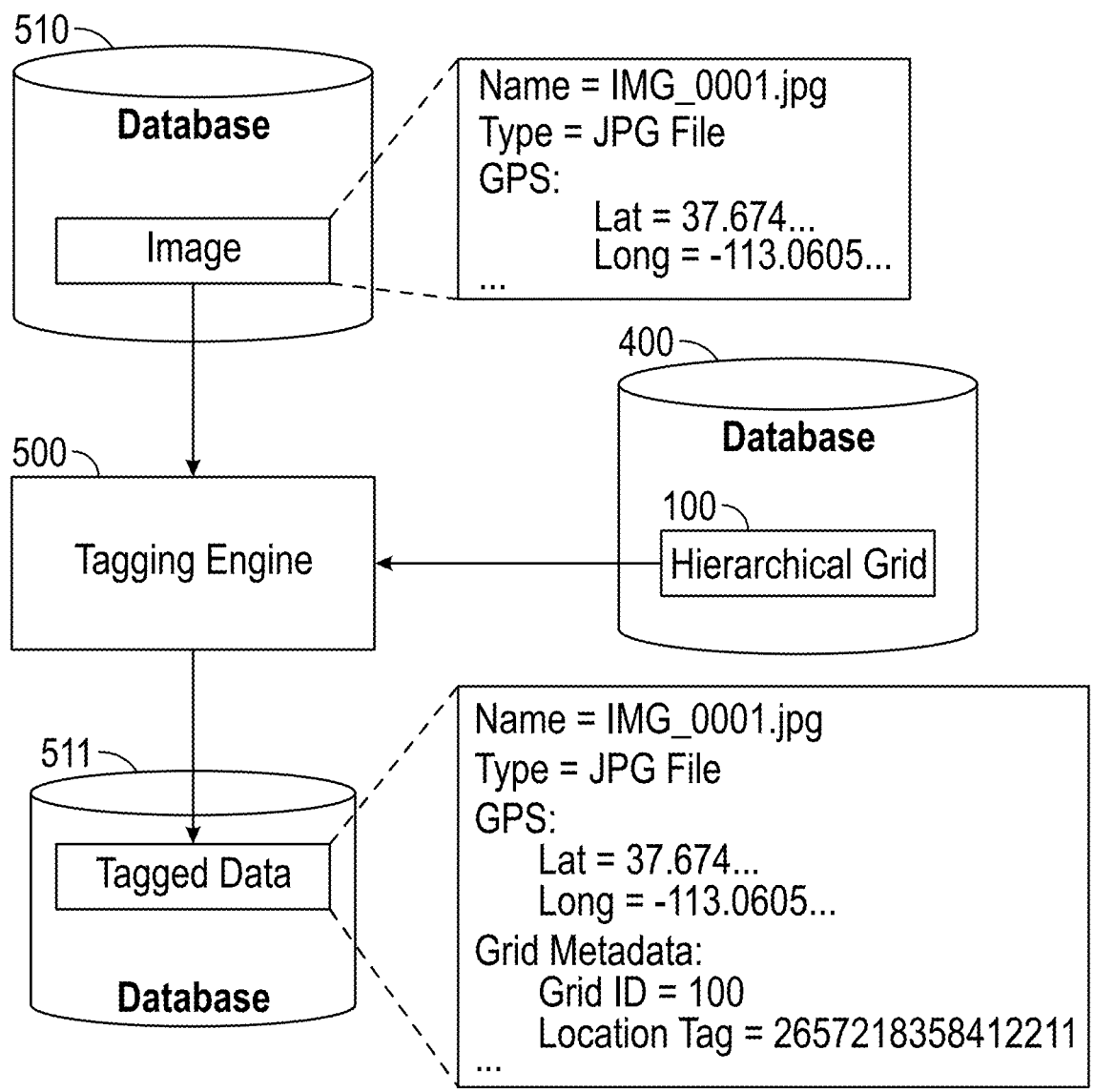
FIGS. 5A-5C each provide an example of how data may be tagged using the location index in accordance with one or more embodiments of the present invention.
Figure 5B:
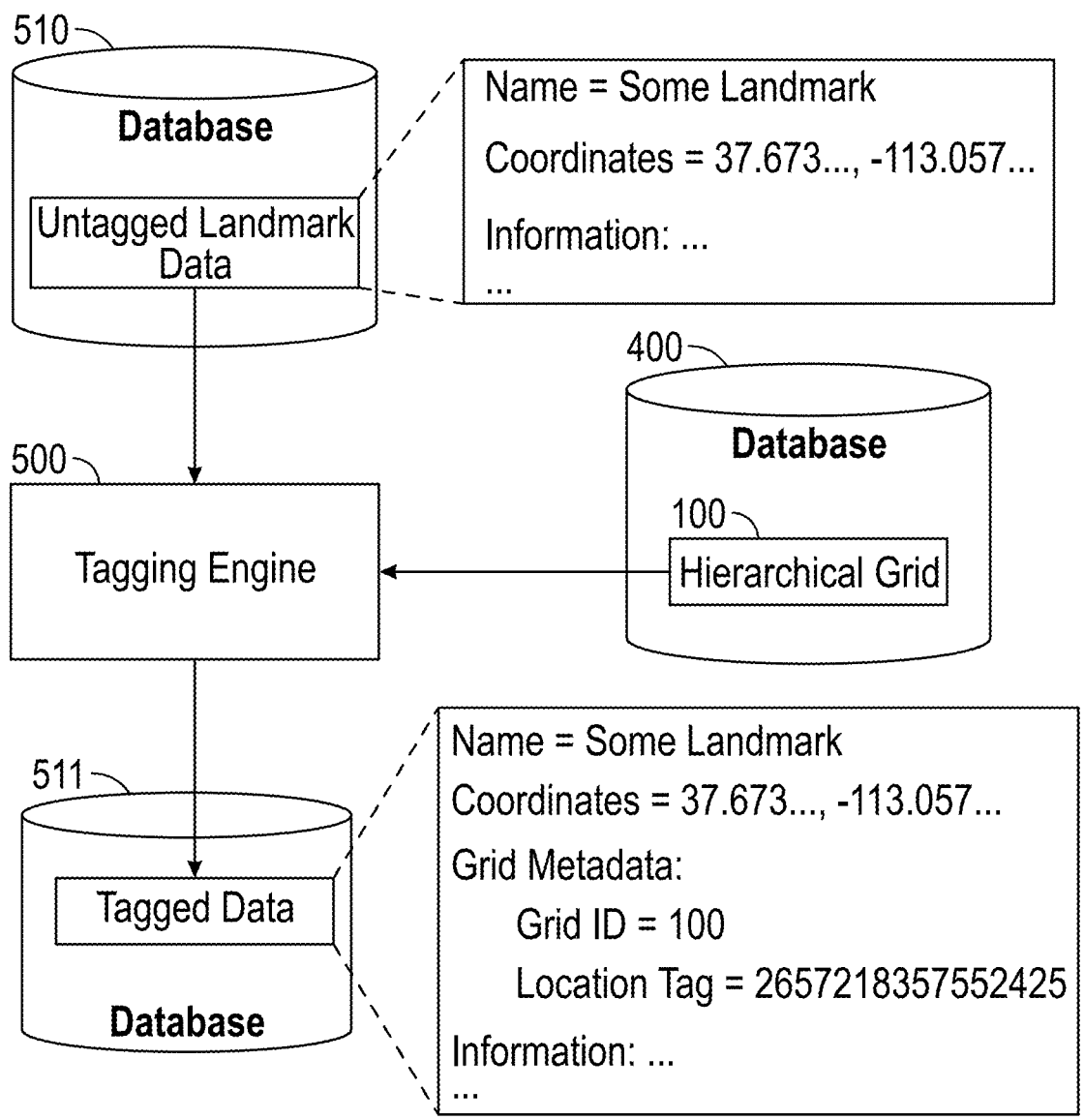
Figure 5C:
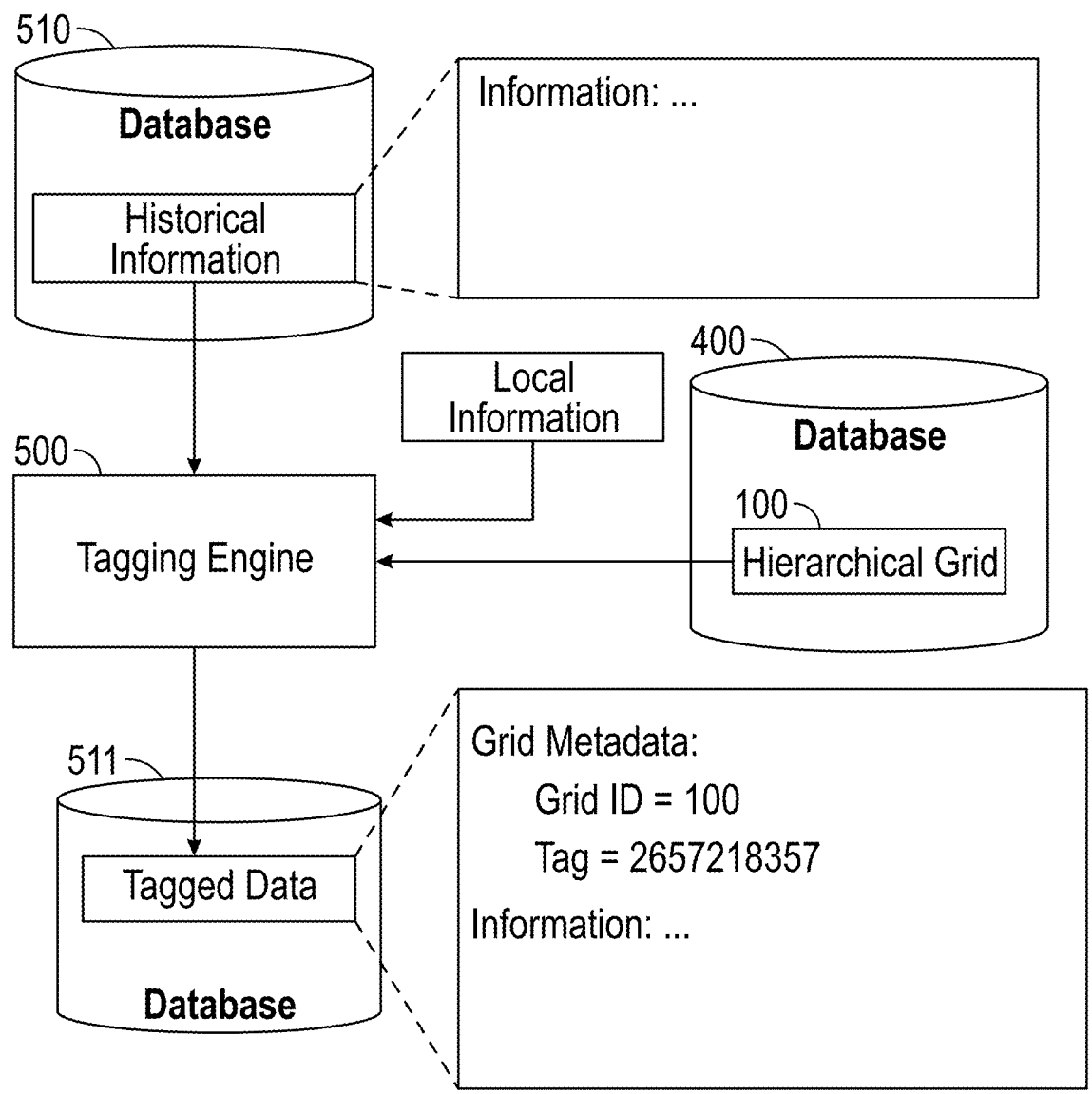

As shown, tagging engine 500 can receive untagged data (or at least data that does not yet have a location tag pertaining to the location index of hierarchical grid 100), evaluate the untagged data (such as its metadata relating to location) against hierarchical grid 100 to identify the proper location tag(s), and associate the identified location tag(s) with the data (such as by adding the location tag(s) as metadata). FIGS. 5A-5C each provide an example of how tagging engine 500 may associate a location tag with a particular type of data to facilitate the inclusion of such data in an augmented or virtual reality environment for Earth.

In FIG. 5A, it is assumed that database 510 stores an image named IMG_0001.jpg that includes GPS metadata indicating that the image was taken at the latitude 37.674 . . . and the longitude −113.0605 . . . . Tagging engine 500 can retrieve this image, identify its GPS metadata, and then evaluate the GPS metadata against hierarchical grid 100 to determine which location tag(s) to associate with the image. In this example, the GPS coordinates for the image pertain to the building located within the cell assigned the location tag of 2657218358412211. Accordingly, tagging engine 500 may add "grid metadata" which may define a grid ID of 100 and a location tag of 2657218358412211. As described in greater detail below, an engine for an augmented or virtual reality environment that leverages hierarchical grid 100 could use this grid metadata to quickly and efficiently identify the image for inclusion in the environment when a user is exploring the cell with this location tag.

In FIG. 5B, it is assumed that database 510 stores landmark data for a landmark with coordinates of 37.673 . . . , −113.057 . . . . For example, this landmark data could include visual, audio, and/or textual information about a landmark. In a similar manner as described above, tagging engine 500 could use the coordinates to determine that a location tag of 2657218357552425 should be associated with the landmark data.

In FIG. 5C, it is assumed that database 510 stores historical information that does not include any location information. For example, this historical information could be textual information about a particular location. In such cases, tagging engine 500 could separately receive/determine location information (e.g., via user input, by employing artificial intelligence and/or natural language processing to determine location information from the information itself, etc.) and use the location information to determine the proper location tag(s) for the historical information. In this example, it is assumed that the location information pertains to a cell with the location tag of 2657218357. For example, the location information could identify that the historical information is about Cedar City, Utah, and therefore the location tag of the fifth-level cell that encompasses Cedar City may be associated with the historical information. Notably, this example represents that the location tag associated with any given data can be at any level of the hierarchical grid. Additionally, multiple locations tags at the same or different levels of the hierarchical grid could be associated with the same data.

Figure 6A:
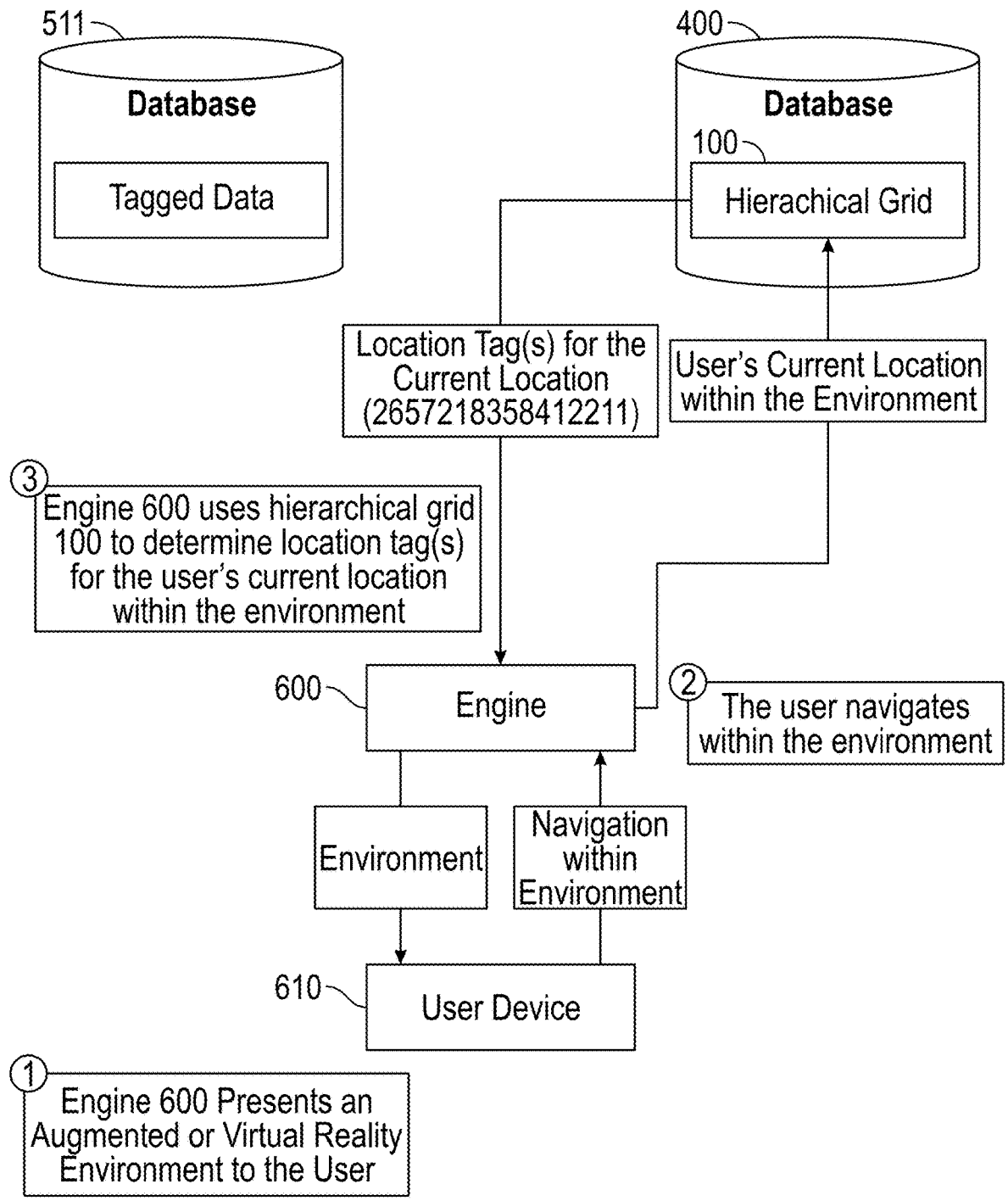
FIGS. 6A and 6B provide an example of how data may be retrieved for inclusion in an augmented or virtual reality environment using location tags of the location index in accordance one or more embodiments of the present invention.
Figure 6B:
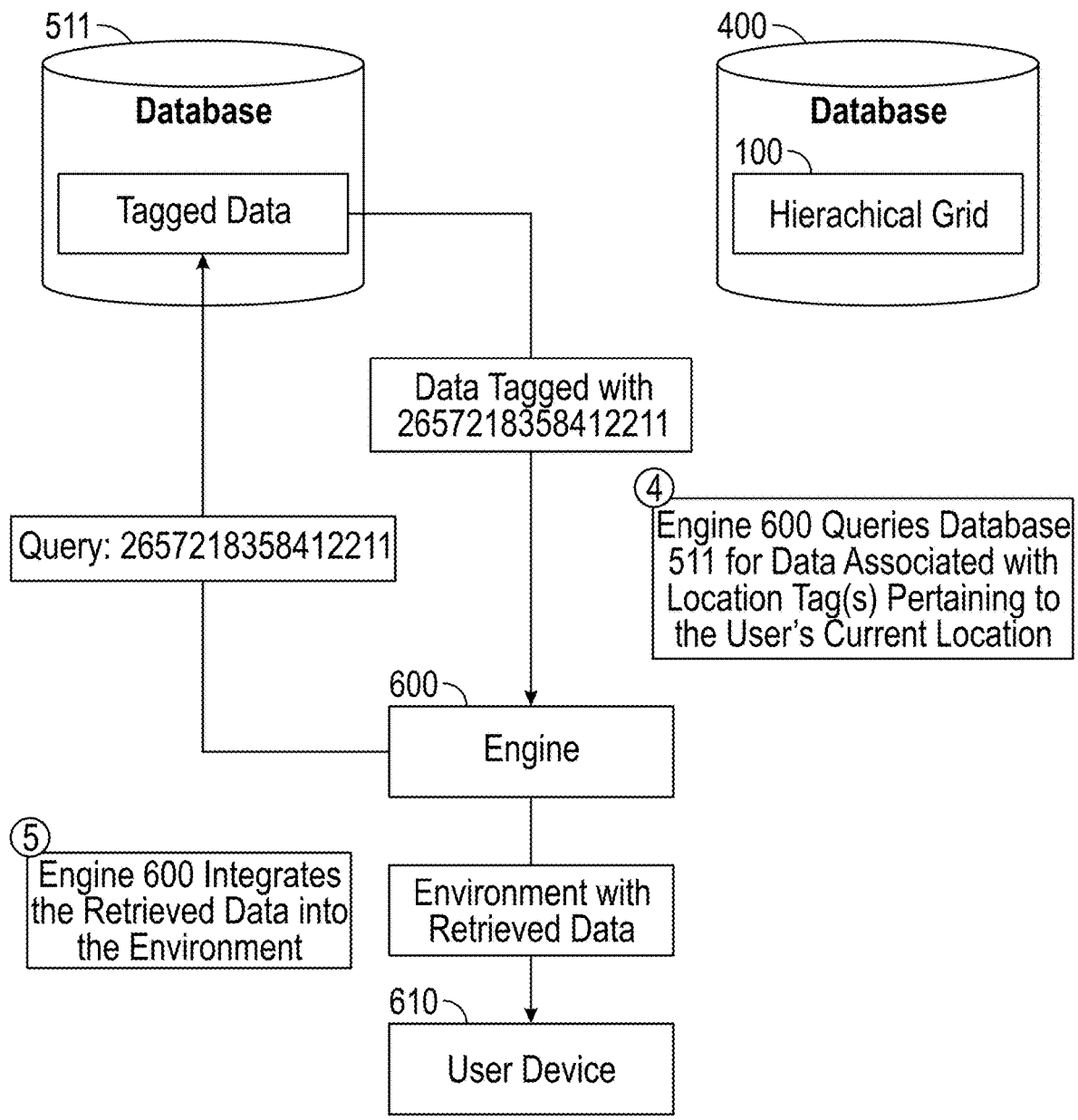

FIGS. 6A and 6B provide an example of how an augmented reality or virtual reality engine 600 (or simply engine 600) can leverage hierarchical grid 100, and particularly the location index it defines, to efficiently integrate data into an augmented or virtual reality environment. In this example, it is assumed that a user employs a user device 610 to view and interact in the augmented or virtual reality environment that engine 600 generates. User device 610 could be any computing device capable of presenting an augmented or virtual reality environment such as a headset, glasses, a smart phone, etc. In some embodiments, engine 600 could execute on user device 610 or on another device such as a server that is accessible to user device 610. Accordingly, the exact manner in which the augmented or virtual reality environment is provided is not essential to the present invention.

The example in FIGS. 6A and 6B is represented as a series of steps. However, these steps are only one example of how embodiments of the present invention may be implemented or leveraged. In step 1, engine 600 presents an augmented or virtual reality environment to the user and is intended to generally represent the ability of the user to enter or experience the environment. For example, if user device 610 is a headset, step 1 could encompass the user's selection to enter an augmented or virtual reality environment of the Earth (or any other planet) and engine 600's initial presentation of the environment to the user via the headset. In step 2, it is assumed that the user navigates within the environment and is intended to generally represent any input or other determination of the user's current location within the environment. For example, step 2 could encompass the user's selection of a location in a virtual reality environment or the determination of the user's current location on Earth in an augmented reality environment.

In step 3, engine 600 can access hierarchical grid 100 to determine one or more location tags for the user's current location. For example, if the user's current location is represented by latitude and longitude, engine 600 could determine which cell(s) encompass the latitude and longitude and obtain the location tag(s) for the cell(s). In the depicted example, it is assumed that the current location falls within the cell having a location tag of 2657218358412211.

Turning to FIG. 6B, in step 4, engine 600 can use the location tag(s) obtained/determined in step 3 to query database 511 to retrieve data that is associated with the location tag(s). For example, engine 600 could retrieve any images, maps, photographs, videos, animations, simulations, audio, text, etc. that have been associated with the location tag 2657218358412211 in the location index of hierarchical grid 100. In some embodiments, if a location tag for a cell at a higher level is specified (e.g., 265721835841), the query could retrieve any data associated with a location tag matching or otherwise containing the specified location tag (e.g., all data associated with a location tag starting with 265721835841). In step 4, engine 600 could specify any other parameters as part of the query such as to limit the results to a particular type of data (e.g., only images) and/or to include other types of tags pertaining to other indexes as described below. Then, in step 5, engine 600 can integrate the retrieved data into the augmented or virtual reality environment. For example, if the data includes an image, engine 600 could present the image in the environment. Similarly, if the data is audio, engine 600 could automatically output the audio or provide an option for the user to select the audio for output.

The process represented in FIGS. 6A and 6B can be repeated as appropriate such as whenever the user navigates within the environment. As described above, engine 600 need not access hierarchical grid 100 each time a new location tag is to be determined. For example, if engine 600 determines that the user has navigated to a location that falls within a neighboring cell, engine 600 could automatically generate the location tag for the neighboring cell (e.g., by incrementing and/or decrementing the appropriate number(s) in the cell number(s)) and then querying for data associated with that location tag. As can be seen, engine 600 can efficiently identify and retrieve the data for a particular location in an environment using only a location tag.

In some embodiments, a depth/elevation index may be used to associate depth/elevation tags with data in addition to the location tag(s). These depth/elevation tags can define the depth or elevation within a cell to which the data pertains. For example, a depth/elevation tag could be used to associate data with a particular floor of a building, a particular elevation of a mountain, a particular depth in a crater or cave, etc. A depth/elevation index may also have a hierarchical structure to facilitate identifying and retrieving data using a depth/elevation tag. For example, each lower level of a depth/elevation index may represent a smaller range of distances.

Figure 7:
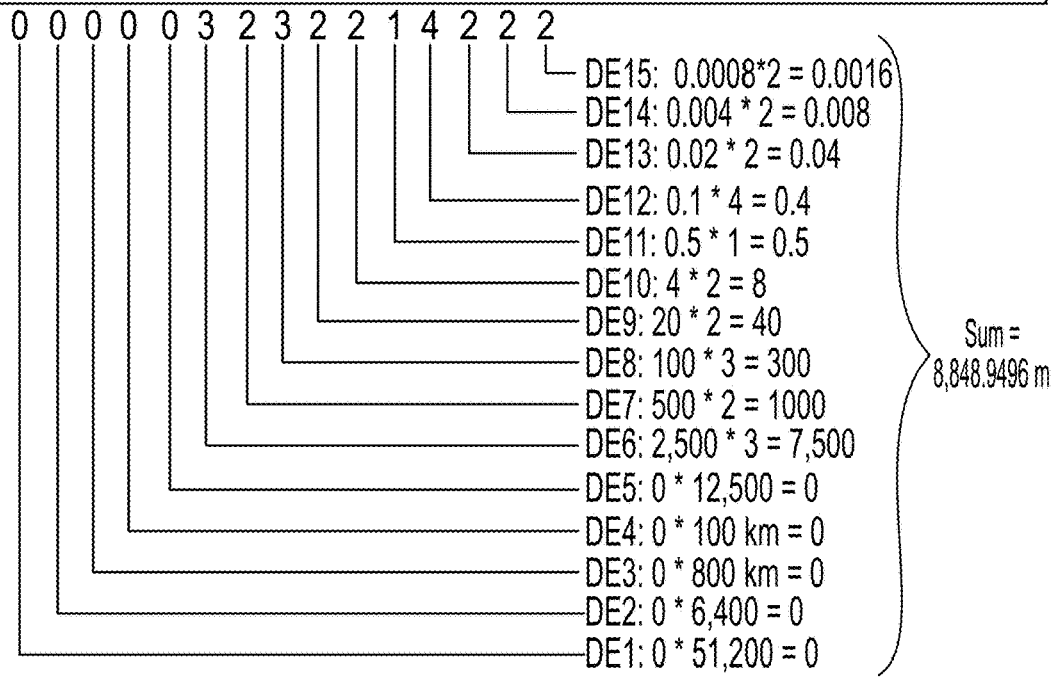
FIG. 7 provides an example of a depth/elevation index that may be used in one or more embodiments of the present invention.

FIG. 7 provides an example of how a depth/elevation index 700 for Earth may be structured. Depth/elevation index 700 includes 15 levels arranged in a hierarchy, although a hierarchy or any suitable number of levels could be used. The topmost level (DE1) represents ranges of 51,200 km from 0 km to 409,600 km. Accordingly, a value of 0 at level DE1 of a depth/elevation tag in depth/elevation index 700 would represent an elevation between 0 km and 51,200 km, whereas a value of 7 would represent an elevation between 358,400 km and 409,600 km. The lower levels in the hierarchy are used to further define the elevation within this range. For example, the bottommost level (DE15) represents ranges of 0.0008 m such that the granularity of a depth or elevation is 0.0008 m. In some embodiments, depth/elevation index 700, or a particular instance of depth/elevation index 700, can define whether the depth/elevation is relative to sea level, the center of the Earth (or other planet), or some other point of reference. For purposes of the example in FIG. 7, it will be assumed that depth/elevation index 700 is relative to sea level.

FIG. 7 provides an example of how depth/elevation index 700 could be used to define a depth/elevation tag of 000003232214222 for an elevation of 8,848.95 meters—the elevation of Mount Everest. Because the elevation is less than 12,500 meters, the values for the first five levels of the hierarchy can be assigned 0. The value for the sixth level of the hierarchy is set to 3 which indicates that the elevation is between 7,500 and 10,000 meters (3*2,500=7,500). The values at each lower level of the hierarchy are set so that the sum of all levels yields the desired elevation. Notably, by using depth/elevation index 700, any depth/elevation falling within the same range at a particular level of the hierarchy will have the same values up to that particular level. For example, any elevation between 500 and 1000 meters will be represented with a depth/elevation tag starting with 0000001. Accordingly, depth/elevation tags can be associated with data to facilitate the quick and efficient identification and retrieval of data relevant to a particular depth or elevation in an augmented or virtual reality environment.

With reference to FIGS. 6A and 6B, when engine 600 considers depth/elevation in the augmented or virtual reality environment, it may use the user's current depth/elevation to also query depth/elevation index 700 for one or more depth/elevation tags pertaining to the user's current depth/elevation. Then, in step 4, engine 600 could query database 511 to retrieve data that is tagged with the location tag(s) and the depth/elevation tag(s) so that the results will include only data pertaining the user's current location and the user's current depth or elevation at the current location. For example, the combined use of the location index and depth/elevation index 700 can facilitate identifying and retrieving data that is relevant to a particular floor of a building at a particular location on Earth by simply specifying a location tag and a depth/elevation tag.

In some embodiments, a time index may be used to associate time tags with data in addition to the location tag(s). These time tags can define a particular time or time period to which data pertains. A time index may also have a hierarchical structure to facilitate identifying and retrieving data using a time tag. For example, each lower level of a time index may represent a smaller interval of time.

FIG. 8 provides an example of a time index 800 that may be used in one or more embodiments of the present invention. Time index 800 includes 18 levels arranged in a hierarchy, although a hierarchy or any suitable number of levels could be used. The topmost level (T1) represents intervals of 2 billion years from 0 to 16 billion. Accordingly, a value of 0 at level T1 of a time tag in time index 800 would represent a time in the past 2 billion years, whereas a value of 7 would represent a time between 14 and 16 billion years ago. The lower levels in the hierarchy are used to further define the time within this interval. For example, the bottommost level (T18) represents intervals of 40 seconds such that the granularity of a time is 40 seconds. In some embodiments, time index 800, or a particular instance of time index 800, can define whether the time is relative to the current time, a past time, or a future time.

A time tag can be generated from time index 800 in a similar manner as a depth/elevation tag can be generated from depth/elevation index 700. Therefore, a detailed example is not provided. As a simple example, a time tag of 000000000000221001 could represent a time 30 days, 4.5 hours and 40 seconds in the past or relative to some other point of reference.

With reference to FIGS. 6A and 6B, when engine 600 considers time in the augmented or virtual reality environment, it may use a specified time (e.g., an exact time or time period that a user desires to explore) to also query time index 800 for one or more time tags. Then, in step 4, engine 600 could query database 511 to retrieve data that is tagged with the location tag(s) and the time tag(s) so that the results will include only data pertaining the user's current location and the specified time. In this way, the combined use of the location index and time index 800 can facilitate identifying and retrieving data that is relevant to a particular location at a particular time. For example, using a location tag and a time tag, engine 600 could query database 511 to retrieve images or videos taken at the U.S. Capitol during the inauguration of one president while not retrieving images or videos taken at the U.S. Capitol during the inauguration of another president.

In some embodiments, a knowledge backbone index may be used to associate knowledge backbone tags with data. A knowledge backbone index may be used with or without a location index. A knowledge backbone index may also have a hierarchical structure to facilitate identifying and retrieving data using a knowledge backbone tag. In some embodiments, a knowledge backbone index may be based on an activity model defined using Information Definition Exchange Format-0 (IDEF-0). For example, a model could organize activities in a hierarchy and a knowledge backbone tag can be used to define each activity's position within the hierarchy. By using a knowledge backbone index, data relevant to a particular activity or process can be quickly and efficiently retrieved for inclusion in an augmented or virtual reality environment by simply using a knowledge backbone tag. The knowledge backbone index also facilitates quickly and efficiently navigating to neighboring data (such as to quickly step through data pertaining to successive steps of an activity or process) given that a knowledge backbone tag inherently defines neighboring knowledge backbone tags.

In some embodiments, a data type index may be used to associate data type tags with data. A data type index may be used with or without a location index. A data type index may also have a hierarchical structure to facilitate identifying and retrieving data using a data type tag. In some embodiments, a data type index may be based on a data model defined using IDEF-1X. For example, a model could organize data types in a hierarchy and a data type tag can be used to define each data type's position within the hierarchy. By using a data type index, data having a particular data type can be quickly and efficiently retrieved for inclusion in an augmented or virtual reality environment by simply using a data type tag. The data type index also facilitates quickly and efficiently navigating to neighboring data given that a data type tag inherently defines neighboring data type tags.

In some embodiments, an individual index may be used to associate individual tags with data. An individual index may be used with or without a location index. An individual index may also have a hierarchical structure to facilitate identifying and retrieving data using an individual tag. In some embodiments, this hierarchical structure could be a family tree structure, an organizational structure, or some other relationship-based structure. By using an individual index, data pertaining to a particular individual can be quickly and efficiently retrieved for inclusion in an augmented or virtual reality environment by simply using an individual tag. The individual index also facilitates quickly and efficiently navigating to related individuals given that an individual tag inherently defines neighboring individual tags.

In summary, embodiments of the present invention provide techniques for efficiently integrating data into augmented and virtual reality environments using tags derived from one or more indexes. Each index may be used to associate a corresponding tag with data that should be made available for inclusion in an augmented or virtual reality environment. Each index may also be used to determine which tag should be used to retrieve data at any given moment while a user interacts in the augmented or virtual reality environment.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for efficiently retrieving data comprising:
   obtaining a location index that defines a hierarchical arrangement of location tags, each location tag defining a location on a planet, wherein the location index defines the hierarchical arrangement of location tags based on a hierarchical grid, each location tag consisting of one or more cell numbers where each cell number is assigned to a cell at a level of the hierarchical grid;
   using the location index to determine location tags for data to be made available;
   associating the location tags with the data;
   determining a first location associated with a user;
   using the location index to determine a first location tag pertaining to the first location associated with the user, the first location tag comprising a first plurality of cell numbers; and
   using the first location tag to identify and retrieve a first set of data that is associated with the first location tag.

2. The method of claim 1, further comprising:
   integrating the first set of data in an environment.

3. The method of claim 2, further comprising:
   obtaining a depth/elevation index that defines a hierarchical arrangement of depth/elevation tags, each depth/elevation tag defining a depth or elevation;
   using the depth/elevation index to determine depth/elevation tags for the data; and
   associating the depth/elevation tags with the data to thereby enable the data to be retrieved for inclusion in the augmented or virtual reality environment using the depth/elevation tags.

4. The method of claim 3, further comprising:
   while a user is interacting with the environment, determining a location of the user and a depth or elevation of the user;
   using the location index to determine a first location tag pertaining to the location of the user;
   using the depth/elevation index to determine a first depth/elevation tag pertaining to the depth or elevation of the user;
   using the first location tag and the first depth/elevation tag to identify and retrieve a first set of data that is associated with the first location tag and the first depth/elevation tag; and
   integrating the first set of data in the environment.

5. The method of claim 2, further comprising:
   obtaining a time index that defines a hierarchical arrangement of time tags, each time tag defining a time;
   using the time index to determine time tags for the data; and
   associating the time tags with the data to thereby enable the data to be retrieved for inclusion in the environment using the time tags.

6. The method of claim 5, further comprising:
   while a user is interacting with the augmented or virtual reality environment, determining a location of the user and a time;
   using the location index to determine a first location tag pertaining to the location of the user;
   using the time index to determine a first time tag pertaining to the time;
   using the first location tag and the first time tag to identify and retrieve a first set of data that is associated with the first location tag and the first time tag; and
   integrating the first set of data in the environment.

7. The method of claim 2, further comprising:
   obtaining a knowledge backbone index that defines a hierarchical arrangement of knowledge backbone tags;
   using the knowledge backbone index to determine knowledge backbone tags for the data; and
   associating the knowledge backbone tags with the data to thereby enable the data to be retrieved for inclusion in the environment using the knowledge backbone tags.

8. The method of claim 2, further comprising:
   obtaining a data type index that defines a hierarchical arrangement of data type tags;
   using the data type index to determine data type tags for the data; and
   associating the data type tags with the data to thereby enable the data to be retrieved for inclusion in the environment using the data type tags.

9. The method of claim 2, further comprising:
   obtaining an individual index that defines a hierarchical arrangement of individual tags;
   using the individual index to determine individual tags for the data; and
   associating the individual tags with the data to thereby enable the data to be retrieved for inclusion in the environment using the individual tags.

10. The method of claim 2, wherein the environment is a real, augmented, or virtual reality environment.

11. The method of claim 1, further comprising:
    determining a second location associated with the user;
    using the location index to determine a second location tag pertaining to the second location associated with the user, the second location tag comprising a second plurality of cell numbers, a leading set of the first plurality of cell numbers matching a leading set of the second plurality of cell numbers; and
    using the second location tag to identify and retrieve a second set of data that is associated with the second location tag.

12. The method of claim 11, wherein the leading set of the first plurality of cell numbers includes all of the first plurality of cell numbers except for a last cell number in the first location tag.

13. One or more computer storage media storing computer executable instructions which when executed implement a method for tagging data to facilitate integration of the data in an augmented or virtual reality environment, the method comprising:
    maintaining a location index comprising location tags, each location tag representing a cell within a hierarchical arrangement of grids using a sequence of one or more cell numbers where each cell number is assigned to a cell at a level of the hierarchical arrangement of grids, each cell encompassing a location on a planet;
    identifying data to be tagged with the location tags;
    determining locations within the planet to which the data pertains;

based on the locations within the planet to which the data pertains, determining, from the location index, location tags for the data;

associating the location tags with the data;

determining a first location;

using the location index to determine a first location tag pertaining to the first location, the first location tag comprising a first plurality of cell numbers; and using the first location tag to identify and retrieve a first set of data that is associated with the first location tag.

14. The computer storage media of claim 13, wherein the method further comprises:

determining a second location;

using the location index to determine a second location tag pertaining to the second location, the second location tag comprising a second plurality of cell numbers, a leading set of the first plurality of cell numbers matching a leading set of the second plurality of cell numbers; and using the second location tag to identify and retrieve a second set of data that is associated with the second location tag.

15. The computer storage media of claim 14, wherein the leading set of the first plurality of cell numbers includes all of the first plurality of cell numbers except for a last cell number in the first location tag.

16. The computer storage media of claim 13, wherein the method further comprises:

integrating the first set of data in an augmented or virtual reality environment.

17. The computer storage media of claim 13, wherein the method further comprises:

maintaining a depth/elevation index comprising depth/elevation tags, each depth/elevation tag defining a depth or elevation within a hierarchical arrangement of depths or elevations;

using the depth/elevation index to determine depth/elevation tags for the data; and associating the depth/elevation tags with the data to thereby enable the data to be retrieved using the depth/elevation tags.

18. The computer storage media of claim 13, wherein the method further comprises:

maintaining a time index comprising time tags, each time tag defining a time within a hierarchical arrangement of times;

using the time index to determine time tags for the data; and associating the time tags with the data to thereby enable the data to be retrieved using the time tags.

19. An augmented or virtual reality system comprising:

one or more processors that implement an engine for creating an augmented or virtual reality environment of a planet; and one or more computer storage media storing a location index comprising location tags, each location tag representing a cell within a hierarchical arrangement of grids using a sequence of one or more cell numbers where each cell number is assigned to a cell at a level of the hierarchical arrangement of grids, each cell encompassing a location on the planet;

wherein the engine is configured to:

determine a first location of a user;

access the location index to obtain a first location tag pertaining to the first location, the first location tag comprising a first plurality of cell numbers;

use the first location tag to query a database for data that is associated with the first location tag; and integrating the data that is associated with the first location tag into the augmented or virtual reality environment.

20. The augmented or virtual reality system of claim 19, wherein the first location is one of a current location of the user or a location specified by the user.

\* \* \* \* \*